US012325235B2

(12) United States Patent
Saito

(10) Patent No.: US 12,325,235 B2
(45) Date of Patent: Jun. 10, 2025

(54) DROPLET DISCHARGE HEAD AND DROPLET DISCHARGE APPARATUS

(71) Applicant: Masahiro Saito, Kanagawa (JP)

(72) Inventor: Masahiro Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 184 days.

(21) Appl. No.: 18/123,358

(22) Filed: Mar. 20, 2023

(65) Prior Publication Data

US 2023/0321979 A1 Oct. 12, 2023

(30) Foreign Application Priority Data

Mar. 22, 2022 (JP) ................................ 2022-045059

(51) Int. Cl.
*B41J 2/14* (2006.01)

(52) U.S. Cl.
CPC ................................ *B41J 2/14201* (2013.01)

(58) Field of Classification Search
CPC .......................... B41J 2/14201; B41J 2202/05
See application file for complete search history.

(56) References Cited

U.S. PATENT DOCUMENTS

2022/0184967 A1 6/2022 Hiraga
2022/0379609 A1 12/2022 Matsufuji et al.

FOREIGN PATENT DOCUMENTS

EP 0 398 000 A1 11/1990
EP 2 732 883 A1 5/2014
JP 8-164611 6/1996
JP 2020-199659 12/2020
JP 2021-151767 9/2021
JP 2022-094924 6/2022
JP 2022-135428 9/2022
WO WO-2013008799 A1 * 1/2013 ........... B05C 5/0225
WO 2021/191728 A1 9/2021

OTHER PUBLICATIONS

Matsufuji Ryohta et al.; Discharge Head, Discharge Unit, and Liquid Discharge Apparatus (WO 2021191728), Sep. 30, 2021, [Paragraphs 0048-0059] (Year: 2021).*
Extended European Search Report issued Aug. 7, 2023 in European Patent Application No. 23162846.2, 7 pages.

* cited by examiner

*Primary Examiner* — Lisa Solomon
(74) *Attorney, Agent, or Firm* — XSENSUS LLP

(57) ABSTRACT

A droplet discharge head includes a lower housing, an upper housing, a nozzle plate, a shaft-shaped member, and a driver. The lower housing includes a flow channel. The upper housing is on the lower housing and detachable from the lower housing. The nozzle plate is on a lower surface of the lower housing. The shaft-shaped member includes a valve element at a tip end of the shaft-shaped member to open and close a nozzle orifice of the droplet discharge head. The shaft-shaped member is reciprocatable in the upper housing. The driver is disposed in the upper housing and reciprocates the shaft-shaped member in an axial direction of the shaft-shaped member. The shaft-shaped member is movable in the axial direction of the shaft-shaped member such that a length of the tip end of the shaft-shaped member protruding from the lower surface of the upper housing is shortened.

16 Claims, 6 Drawing Sheets

DROPLET DISCHARGE HEAD AND DROPLET DISCHARGE APPARATUS

CROSS-REFERENCE TO RELATED APPLICATIONS

This patent application is based on and claims priority pursuant to 35 U.S.C. § 119 (a) to Japanese Patent Application No. 2022-045059, filed on Mar. 22, 2022, in the Japan Patent Office, the entire disclosure of which is hereby incorporated by reference herein.

BACKGROUND

Technical Field

Embodiments of the present disclosure relate to a droplet discharge head and a droplet discharge apparatus.

Related Art

A droplet discharge apparatus is known that opens and closes minute nozzle orifices formed on a nozzle plate with respective valve elements each disposed at a tip end of a needle valve to discharge pressurized liquid inside the nozzle plate as liquid droplets from the nozzle orifices. A rear end of each of the needle valves is connected to a driver, i.e., an actuator, such as a piezoelectric element that extends and contracts. The driver extends and contracts to vibrate in a longitudinal direction of the needle valve to open and close the valve element. Accordingly, pressurized ink is discharged as liquid droplets from the nozzle orifice at a moment when the valve element opens.

In addition to the driver that employs an electromagnetic solenoid, a driver that employs a piezoelectric element to drive a needle valve is also known. Such a droplet discharge apparatus as described above is used in various fields, for example, to draw a graphic on a body of an automobile with high image quality, or to discharge liquid resist or a deoxyribonucleic acid (DNA) sample as droplets.

SUMMARY

In an embodiment of the present disclosure, a droplet discharge head includes a lower housing, an upper housing, a nozzle plate, a shaft-shaped member, and a driver. The lower housing includes a flow channel. The upper housing is on the lower housing and detachable from the lower housing. The nozzle plate is on a lower surface of the lower housing. The shaft-shaped member includes a valve element at a tip end of the shaft-shaped member to open and close a nozzle orifice of the droplet discharge head. The shaft-shaped member is reciprocatable in the upper housing. The driver is disposed in the upper housing and reciprocates the shaft-shaped member in an axial direction of the shaft-shaped member. The shaft-shaped member is movable in the axial direction of the shaft-shaped member such that a length of the tip end of the shaft-shaped member protruding from the lower surface of the upper housing is shortened.

In another embodiment of the present disclosure, a droplet discharge apparatus includes the droplet discharge head.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
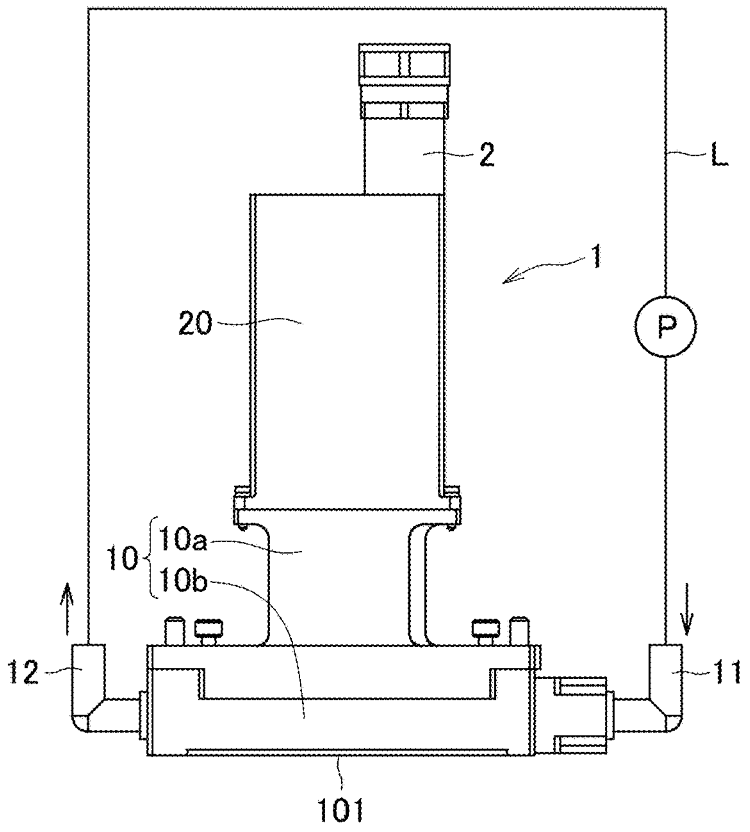
FIG. 1A is a front view of a droplet discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Droplet Discharge Head

Figure 1B:
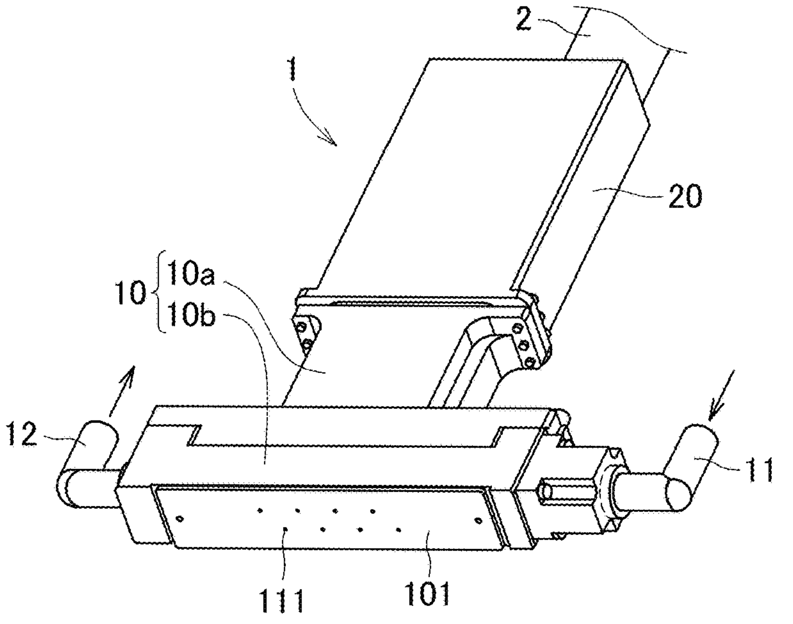
FIG. 1B is a perspective view of the droplet discharge head of FIG. 1A as viewed from obliquely below.

Embodiments of the present disclosure are described below with reference to the attached drawings. FIG. 1A is a front view of the droplet discharge head 1 according to an embodiment of the present disclosure. FIG. 1B is a perspective view of the droplet discharge head 1, viewed from obliquely below.

A housing 10 of the droplet discharge head 1 includes an upper housing 10*a* and a lower housing 10*b*. The upper housing 10*a* is disposed on the lower housing 10*b* and detachable from the lower housing 10*b*. A cover 20 is fitted onto the upper housing 10*a* and electrical components are arranged inside the cover 20. A connector 2, as an electrical component, is attached to an upper end of the cover 20.

A nozzle plate 101 made of corrosion-resistant metal such as steel use stainless (SUS) is disposed on a lower surface of the lower housing 10*b*. Droplets are discharged from minute nozzle orifices 111 formed on the nozzle plate 101.

Figure 3A:
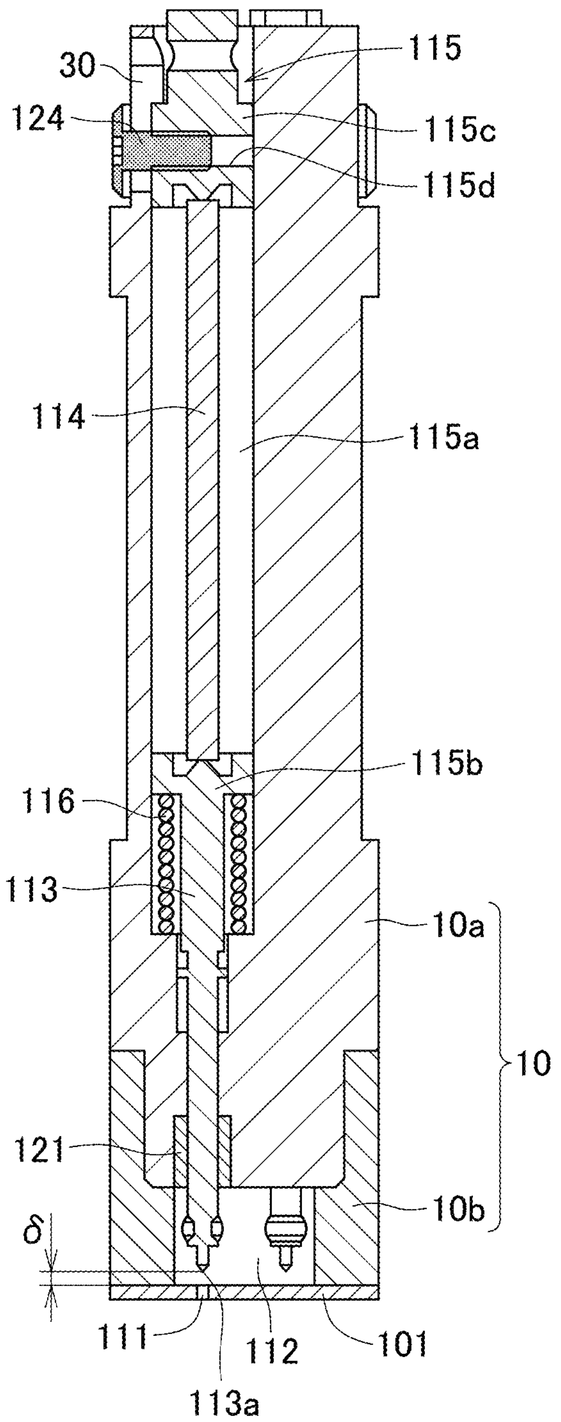
FIG. 3A is a cross-sectional view of a droplet discharge head, in which valve elements of the droplet discharge head are protruded, according to an embodiment of the present disclosure.
Figure 3B:
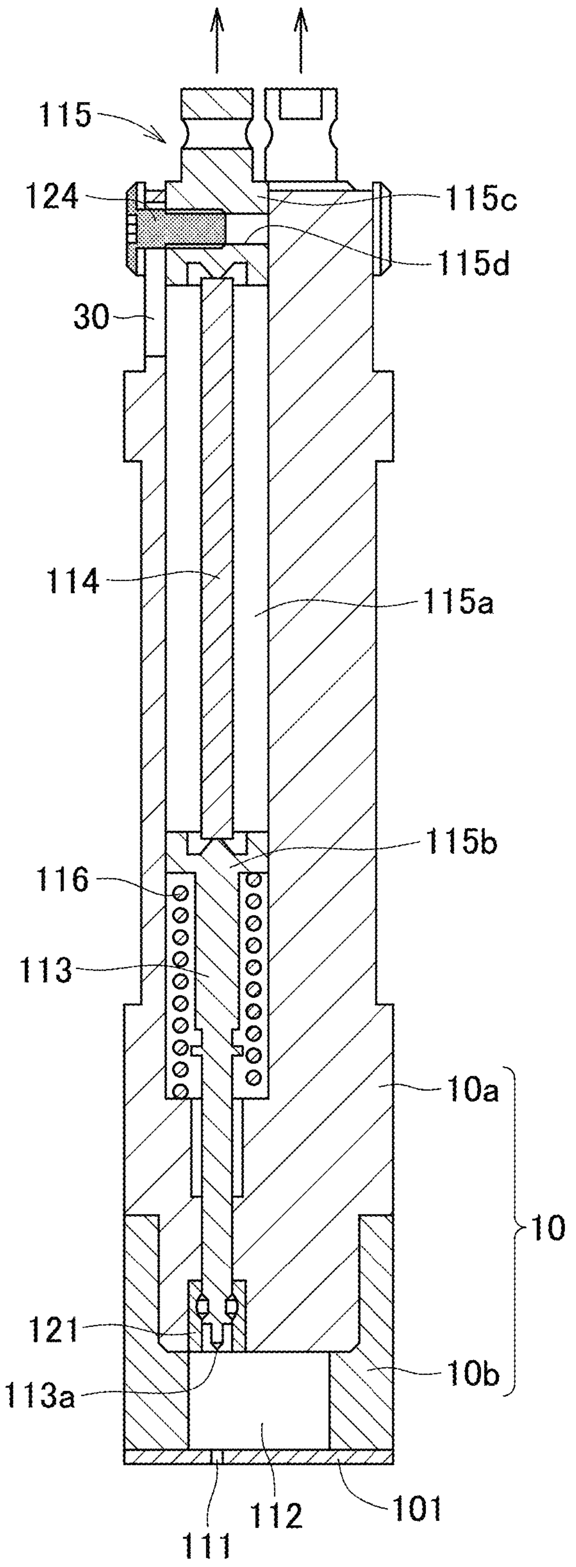
FIG. 3B is a cross-sectional view of the droplet discharge head of FIG. 3A, in which the valve elements of the droplet discharge head are retracted.

As illustrated in FIGS. 3A and 3B, a flow channel 112 to flow liquid is formed inside the lower housing 10*b*. One end of the flow channel 112 communicates with a supply port 11, and the other end of the flow channel 112 communicates with a collection port 12 (see FIGS. 1A and 1B).

The supply port 11 and the collection port 12 are connected to each other via a circulation path L (see FIG. 1A). Accordingly, pressurized liquid that has been pressurized by a pump P on the circulation path L is supplied to the supply port 11. The pressurized liquid that has not been discharged from the nozzle orifices 111 is collected from the collection port 12 and is then supplied again to the supply port 11 via the circulation path L and the pump P.

Figure 2A:
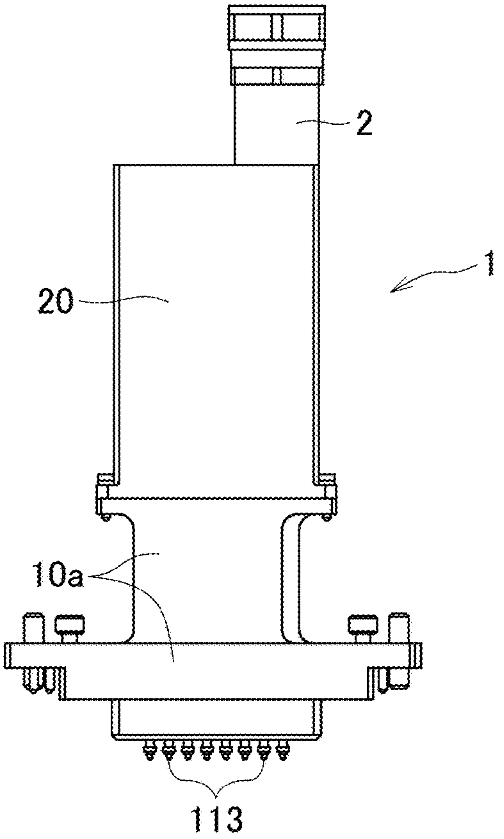
FIG. 2A is a front view of the droplet discharge head of FIG. 1A from which a lower housing of the droplet discharge head is detached.
Figure 2B:
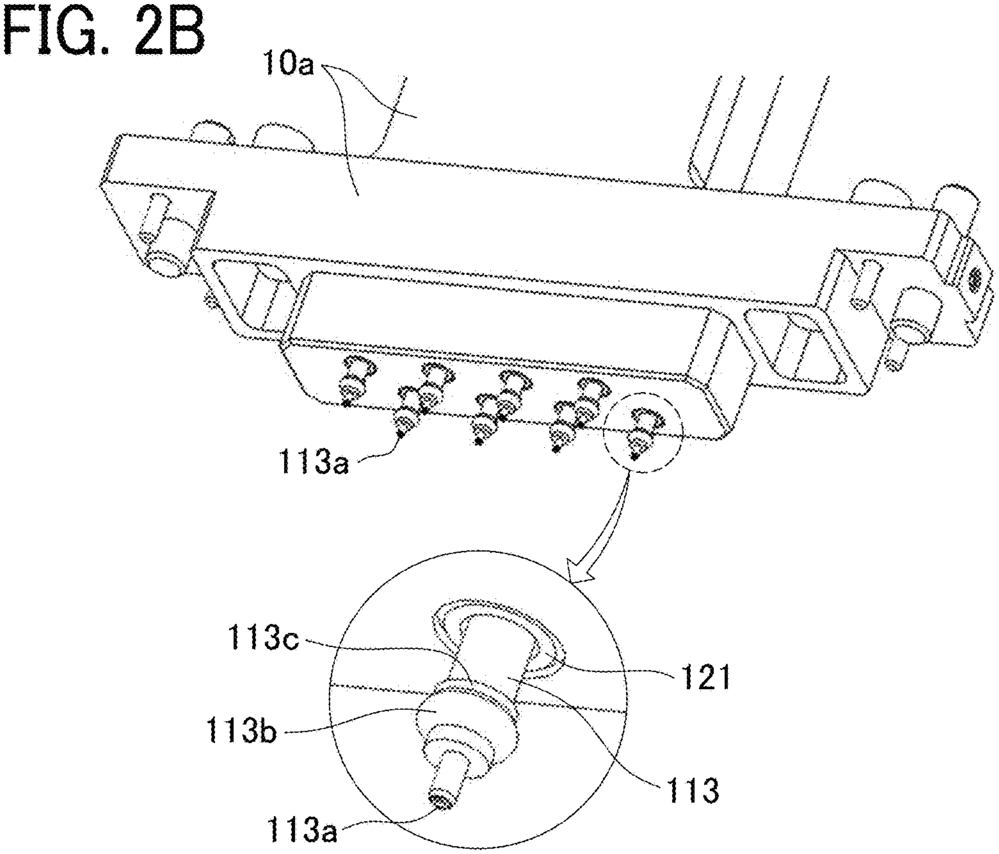
FIG. 2B is an enlarged perspective view of a lower end of the droplet discharge head of FIG. 1A.

When the above-described lower housing 10*b* is detached from the upper housing 10*a*, each of the tip ends of the needle valves 113 as shaft-shaped members is exposed from a bearing 121 on a lower surface of the upper housing 10*a*, as illustrated in the FIGS. 2A and 2B. The needle valve 113 is made of corrosion-resistant metal such as steel use stainless (SUS) and is extremely thin, with a diameter of 1 mm or less in a thin portion and a diameter of about 2 mm in a thick portion of the needle valve 113. Each of the thin needle valves 113 is exposed from the bearing 121 on the upper housing 10*a* by, for example, 1 to 20 mm.

A valve element 113*a* that opens and closes the nozzle orifice 111 is disposed at the tip end of the needle valve 113. An elastic O-ring 113*b* that serves as a sealer and a washer 113*c* that fixes the O-ring 113*b* to the needle valve 113 are disposed around the needle valve 113 above the valve element 113*a*.

In a droplet discharge head in the art, tip ends of needle valves are exposed from an upper housing of the droplet discharge head as illustrated in FIGS. 2A and 2B. For this reason, the droplet discharge head may be damaged, for example, in an assembly process, a transportation process of the droplet discharge head or in an explosion-proof authentication test.

In the present embodiment, as illustrated in FIGS. 3A and 3B, the tip end of the needle valve 113 is projectable from and retractable into the upper housing 10*a*. Accordingly, the tip end of the needle valve 113 can be pulled into the upper housing 10*a* in the assembly process, the transportation process, or the explosion-proof authentication test as needed.

Driving Needle Valve to Open and Close

As illustrated in FIGS. 3A and 3B, multiple piezoelectric elements 114 are disposed in the upper housing 10*a*. Each of the piezoelectric elements 114 drives corresponding one of the valve elements 113*a* and the needle valves 113. The piezoelectric element 114 is held in a central space 115*a* of a holder 115.

The holder 115 includes springs at both an upper end and a lower end of the holder 115, and the piezoelectric element 114 is held such that the piezoelectric element 114 is compressed in an axial direction of the piezoelectric element 114 by the springs. A tip end 115*b* of the holder 115 and a rear end of the needle valve 113 are coupled to each other such that the piezoelectric element 114 and the needle valve 113 are coaxially disposed with each other. Accordingly, when the piezoelectric element 114 contracts in a longitudinal direction of the piezoelectric element 114, the holder 115 also contracts in a longitudinal direction of the holder 115. Thus, a biasing force acts on the needle valve 113 in a direction in which the nozzle orifice 111 opens.

The piezoelectric element 114 operates in a d31 mode when a voltage is applied by a voltage application device to drive the needle valve 113 in the direction in which the nozzle orifice 111 opens. In other words, when the voltage is applied to the piezoelectric element 114, the needle valve 113 is driven in the direction in which the nozzle orifice 111 opens.

Accordingly, when no voltage is applied to the piezoelectric element 114, the nozzle orifice 111 is closed by the needle valve 113. Accordingly, even when pressurized liquid is supplied to the flow channel 112, the liquid is not discharged from the nozzle orifice 111.

When a voltage is applied to the piezoelectric element 114, the piezoelectric element 114 contracts to pull the needle valve 113 via the holder 115. Thus, the valve element 113*a* of the needle valve 113 is separated from the nozzle orifice 111 to open the nozzle orifice 111. Accordingly, the pressurized liquid supplied to the flow channel 112 is discharged as droplets from the nozzle orifice 111.

The piezoelectric element 114 may operate in a d33 mode in which the piezoelectric element 114 extends in a direction in which the needle valve 113 is closed when a voltage is applied to the piezoelectric element 114. When the piezoelectric element 114 operates in the d33 mode, the valve element 113*a* of the needle valve 113 is pressed against the nozzle orifice 111 to close the nozzle orifice 111 in a state in which a voltage is applied to the piezoelectric element 114.

When droplets are discharged, application of a voltage to the piezoelectric element 114 is stopped or the voltage is decreased. Accordingly, the valve element 113*a* of the needle valve 113 moves in the direction in which the valve element 113*a* opens to open the nozzle orifice 111. The d33 mode of the piezoelectric element 114 has high responsiveness and large amount of displacement. Therefore, the d33 mode is suitable in the case where it is desired to enhance the responsiveness of the needle valve 113 when the needle valve 113 opens and closes and reduce variations in the droplet discharge speed and the amount of the droplets discharged from the nozzle orifice 111.

Vertical Movement of Needle Valve

Each of the holders 115 is disposed in the upper housing 10*a* such that the position of the holder 115 is adjustable in an up-and-down direction in FIGS. 3A and 3B. The holder 115 is biased upward by a compression spring 116 as a biasing member disposed in the upper housing 10*a*. The compression spring 116 moves the needle valve 113 upward as illustrated in FIG. 3B together with the holder 115 at a moment when a later-described securing screw 124 is loosened. The needle valve 113 may also be manually moved upward as illustrated in FIG. 3B without the compression spring 116.

A rear end 115*c* of the holder 115 is positioned relative to and secured to the upper housing 10*a* by the securing screw 124. An internally-threaded hole 115*d* is disposed in the rear end 115*c* of each of the holders 115 in a direction orthogonal to the axial direction of the holder 115, and a tip end of the securing screw 124 is screwed into the internally-threaded hole 115*d*. Note that a special screw such as a Torx (registered trademark) screw can be used as the securing screw 124 in a case in which it is desired to prevent the position of the needle valve 113 from being easily changed or in a case in which it is desired to allow only an operator having a specific authority to change the position of the needle valve 113.

Figure 4A:
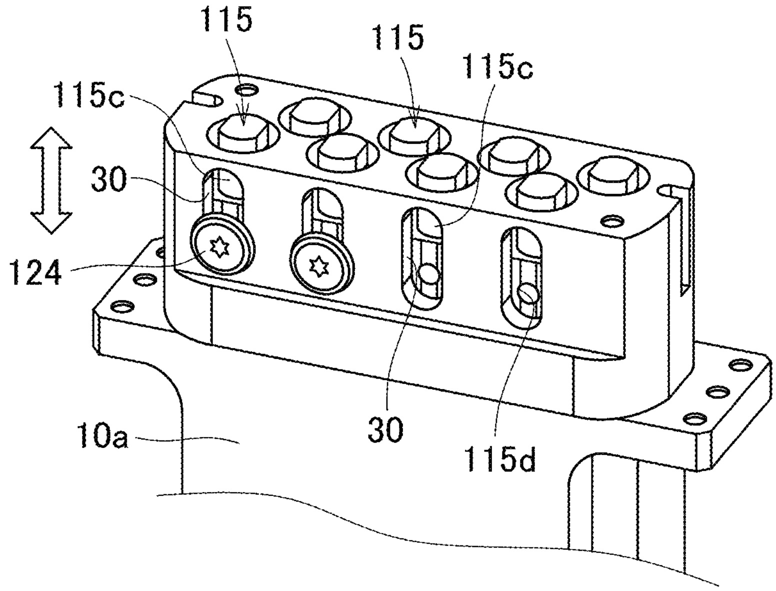
FIG. 4A is a perspective view of a rear end of a droplet discharge head in which the valve elements of the droplet discharge head are protruded, according to an embodiment of the present disclosure.
Figure 4B:
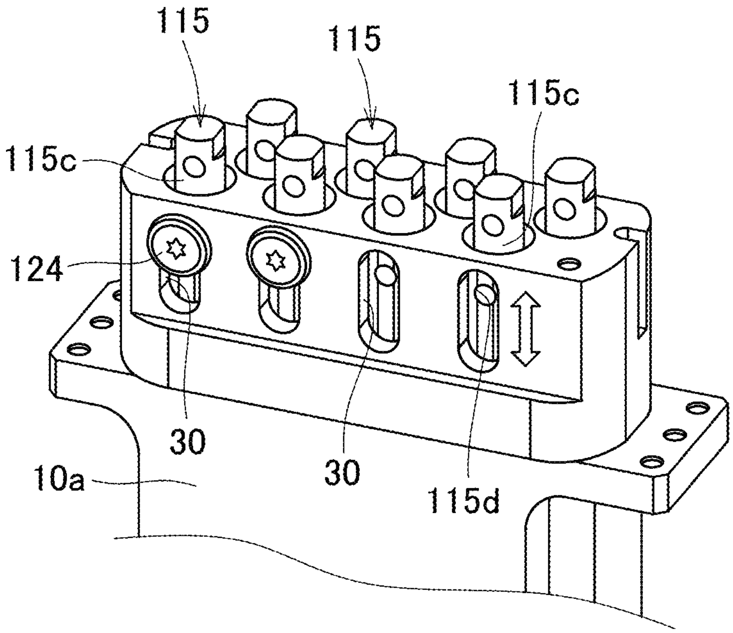
FIG. 4B is a perspective view of the rear end of the droplet discharge head of FIG. 4A in which the valve elements of the droplet discharge head are retracted, according to an embodiment of the present disclosure.

In an upper end of the upper housing 10*a*, as illustrated in FIGS. 4A and 4B, elongated holes 30 elongated in the axial direction of the holder 115 are formed, and the securing screws 124 are inserted through the respective elongated holes 30. Loosening the securing screw 124 allows the holder 115 to move in an up-and-down direction in FIGS. 4A and 4B.

The securing screw 124 is fastened relative to and fixed to the elongated hole 30 at a position at which a predetermined clearance 8 is formed between the valve element 113*a* and the nozzle orifice 111, as illustrated in FIG. 3A. The droplet discharge head 1 is delivered as a product, in the state as described above. When the securing screw 124 is loosened, as illustrated in FIGS. 3B and 4B, the securing screw 124 moves to and stops at the upper end of the elongated hole 30 by the biasing force of the compression spring 116.

Accordingly, the valve element 113*a* at the tip end of the needle valve 113 can be quickly pulled into the bearing 121 to a position corresponding to the lower surface of the upper housing 10*a* as illustrated in FIG. 3B. In other words, the length of the tip end of the needle valve 113, including the valve element 113*a*, that protrudes from the lower surface of the upper housing 10*a* can be shortened. For this reason, in a state as illustrated in FIG. 3B, even if the lower housing 10*b* is detached from the upper housing 10*a*, the tip end of the needle valve 113 and the valve element 113*a* are not damaged by, for example, an impact from outside. In addition, an object such as a foreign matter can be prevented from adhering to the valve element 113*a*.

The holder 115 and the needle valve 113 are disposed such that the holder 115 and the needle valve 113 are movable in the axial direction of the holder 115 by moving the securing screw 124 when the piezoelectric element 114 is not driven. Accordingly, the positions of the holder 115 and the needle valve 113 can be adjusted without applying a voltage to the piezoelectric element 114.

Preferably, the tip end of the needle valve 113 is sufficiently retracted into the upper housing 10*a* as illustrated in FIG. 3B. However, a case in which the tip end of the needle valve 113 is partially retracted into the upper housing 10*a* from the state illustrated in FIG. 3A is also included in the scope of embodiments of the present disclosure.

Droplet Discharge Apparatus

Figure 5:
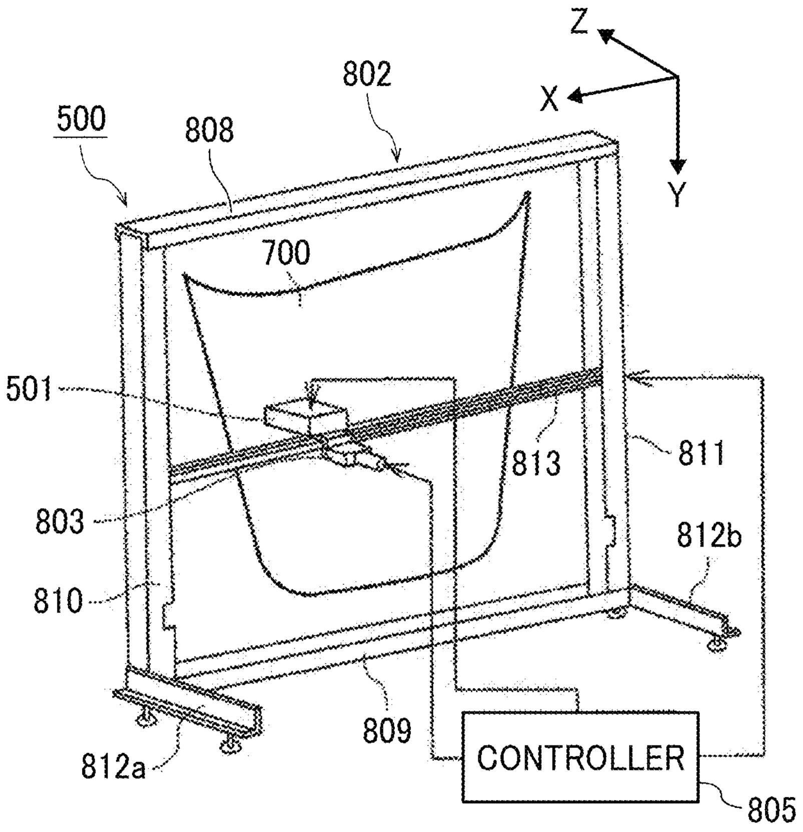
FIG. 5 is a perspective view of a droplet discharge apparatus according to an embodiment of the present disclosure.
Figure 6:
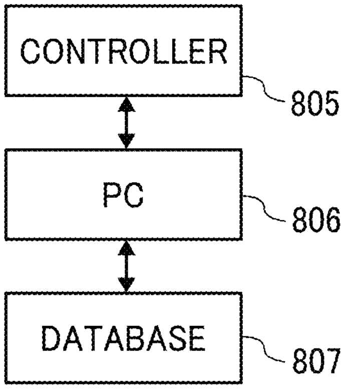
FIG. 6 is a diagram illustrating a block diagram of a controller provided for the droplet discharge apparatus, according to an embodiment of the present disclosure.
Figure 7:
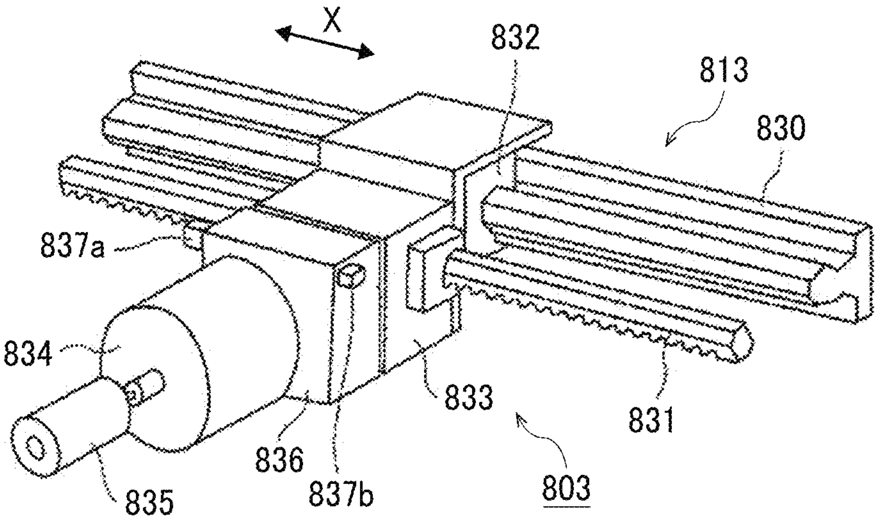
FIG. 7 is a perspective view of a driver of the droplet discharge apparatus of FIG. 5, according to an embodiment of the present disclosure.

Next, a droplet discharge apparatus 500 that employs the droplet discharge head 1 of FIG. 1A according to an embodiment of the present disclosure is described with reference to FIGS. 5, 6 and 7. FIG. 5 is a perspective view of the droplet discharge apparatus 500 according to the present embodiment. FIG. 7 is a perspective view of a driver of the droplet discharge apparatus 500 according to the present embodiment.

The droplet discharge apparatus 500 includes a movable frame unit 802 installed to face a print object 700 having a curved surface such as a hood of a vehicle. A movable unit 813 is attached to a right frame 811 and a left frame 810 of a frame unit 802 such that the movable unit 813 is bridged between the right frame 811 and the left frame 810. The movable unit 813 is movable in the vertical direction, i.e., a direction indicated by arrow Y in FIG. 5.

The movable unit 813 includes a driver 803 and a droplet discharger 501. The driver 803 includes a built-in motor to allow the driver 803 to be reciprocally movable on the movable unit 813 in a horizontal direction, i.e., a direction indicated by arrow X in FIG. 5. The droplet discharger 501 is attached to the driver 803 and discharges liquid toward the print object 700.

The droplet discharge apparatus 500 also includes a controller 805 and an information processing device 806 such as a personal computer (PC) that issues instructions to the controller 805. The controller 805 controls discharge of liquid from the droplet discharger 501, reciprocal movement of the driver 803, and lifting and lowering of the movable unit 813. The information processing device 806 is connected to a database (DB) unit 807 that records and stores data of the print object 700 such as a shape and a size of the print object 700.

The frame unit 802 further includes an upper frame 808, a lower frame 809, the right frame 811, and the left frame 810 that are formed of, for example, columnar metal. The frame unit 802 further includes a right leg 812*b* and a left leg 812*a* that are attached at right angles and horizontally to both sides of the lower frame 809 to cause the frame unit 802 stand by itself. The movable unit 813 bridged between the right frame 811 and the left frame 810 is movable in the vertical direction while supporting the driver 803.

The print object 700 is disposed perpendicular to a liquid discharge direction indicated by arrow Z in FIG. 5. In other words, the print object 700 is disposed to face a flat surface formed by the upper frame 808, the lower frame 809, the right frame 811, and the left frame 810 of the frame unit 802. In such a case, the back side of a printing area of the print object 700 can be attracted and held at a predetermined position at which printing is to be performed by, for example, a chuck attached to a leading end of an arm of an articulated arm robot to locate the print object 700. Using the above-described articulated arm robot allows the print object 700 to be accurately located at a position at which printing is to be performed and the posture of the print object 700 to be changed where appropriate.

As illustrated in FIG. 5, the driver 803 is disposed to be reciprocally movable in the horizontal direction, i.e., X direction, on the movable unit 813. As illustrated in FIG. 7, the movable unit 813 includes a rail 830, a rack gear 831, a linear guide 832, a pinion gear unit 833, a motor 834, and a rotary encoder 835. The rail 830 horizontally extends between the right frame 811 and the left frame 810 of the frame unit 802. The rack gear 831 is disposed parallel to the rail 830. The linear guide 832 is externally fitted to a part of the rail 830 to be movable while sliding. The pinion gear unit 833 is connected to the linear guide 832 and meshed with the rack gear 831. The motor 834 is provided with a decelerator 836 and rotationally drives the pinion gear unit 833. The rotary encoder 835 detects a printing position.

Driving the motor 834 to rotate forward or reverse causes the droplet discharger 501 to move in the right direction or the left direction along the movable unit 813. The driver 803 functions as a driving mechanism of the droplet discharger 501 in the X direction in FIGS. 5 and 7. Limit switches 837*a* and 837*b* are attached to both sides of a housing of the decelerator 836.

The droplet discharger 501 includes, for example, the multiple droplet discharge heads 1 that discharge liquid of different colors of black, cyan, magenta, yellow, and white, or a droplet discharge head 1 having multiple nozzle rows. Liquid of each color is supplied under pressure from a liquid tank to the corresponding one of the droplet discharge heads 1 of the droplet discharger 501 or corresponding one of nozzle rows of the droplet discharge head 1.

In the droplet discharge apparatus 500, the movable unit 813 is moved in the Y direction and the droplet discharger 501 is moved in the X direction to print a desired image on the print object 700. The above-described term "droplet discharge apparatus" is not limited to an apparatus that discharge liquid to visualize meaningful images, such as letters or figures. For example, the droplet discharge apparatus may be an apparatus to form such as meaningless patterns, uniform layer of paint or fabricate three-dimensional images.

Although some embodiments of the present disclosure have been described above, embodiments of the present disclosure are not limited to the embodiments described above, and a variety of modifications can be made within the scope of the present disclosure. For example, the compression spring 116 that biases the needle valve 113 upward may be replaced with a plate spring having a similar biasing force or a driver using, for example, a motor.

Note that in the above-described embodiments of the present disclosure, the housing closer to the nozzle plate 101 is defined as the lower housing 10*b* and the housing farther from the nozzle plate 101 is defined as the upper housing 10*a*. However, the terms "upper" and "lower" do not limit the relative positions and arrangement positions of components in the direction of gravity during manufacture and use of the droplet discharge head.

Further, the piezoelectric element 114 is replaceable with another driver that extends and contracts in the longitudinal direction. For example, a piston that extends and contracts in the longitudinal direction by an electromagnetic solenoid may be used instead of the piezoelectric element 114.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A droplet discharge head comprising:
a lower housing including a flow channel;
an upper housing on the lower housing, the upper housing detachable from the lower housing;
a nozzle plate on a lower surface of the lower housing;
a shaft-shaped member including a valve element at a tip end of the shaft-shaped member to open and close a nozzle orifice of the droplet discharge head, the shaft-shaped member being reciprocatable in the upper housing; and
a driver in the upper housing to reciprocate the shaft-shaped member in an axial direction of the shaft-shaped member,
wherein:
the shaft-shaped member is movable in the axial direction of the shaft-shaped member such that a length of the tip end of the shaft-shaped member protruding from a lower surface of the upper housing is shortened, and
the shaft-shaped member is movable in the axial direction of the shaft-shaped member when the driver is not driven.

2. The droplet discharge head according to claim 1, further comprising:
a biasing member to bias the shaft-shaped member toward the upper housing.

3. The droplet discharge head according to claim 2,
wherein the driver includes a piezoelectric element and a holder to hold the piezoelectric element, and
wherein the shaft-shaped member is positioned when a rear end of the holder is positioned relative to and secured to the upper housing.

4. The droplet discharge head according to claim 3,
wherein the upper housing includes an elongated hole at the rear end of the upper housing, and
wherein the holder is positioned relative to and secured to the upper housing when a securing screw inserted in the elongated hole is screwed into the rear end of the holder.

5. The droplet discharge head according to claim 4,
wherein the biasing member biases the shaft-shaped member such that the shaft-shaped member moves toward the upper housing to shorten the length of the tip end of the shaft-shaped member protruding from the lower surface of the upper housing when the securing screw is loosened.

6. A droplet discharge apparatus comprising:
the droplet discharge head according to claim 1.

7. A droplet discharge head comprising:
a lower housing including a flow channel;
an upper housing on the lower housing, the upper housing detachable from the lower housing;
a nozzle plate on a lower surface of the lower housing;
a shaft-shaped member including a valve element at a tip end of the shaft-shaped member to open and close a nozzle orifice of the droplet discharge head, the shaft-shaped member being reciprocatable in the upper housing; and
a driver in the upper housing to reciprocate the shaft-shaped member in an axial direction of the shaft-shaped member,
wherein:
the shaft-shaped member is movable in the axial direction of the shaft-shaped member such that a length of the tip end of the shaft-shaped member protruding from a lower surface of the upper housing is shortened,
the driver includes a piezoelectric element and a holder to hold the piezoelectric element, the shaft-shaped member is positioned when a rear end of the holder is positioned relative to and secured to the upper housing,
the upper housing includes an elongated hole at the rear end of the upper housing, and
the holder is positioned relative to and secured to the upper housing when a securing screw inserted in the elongated hole is screwed into the rear end of the holder.

8. The droplet discharge head according to claim 7, further comprising:
a biasing member to bias the shaft-shaped member toward the upper housing.

9. The droplet discharge head according to claim 8,
wherein the biasing member biases the shaft-shaped member such that the shaft-shaped member moves toward the upper housing to shorten the length of the tip end of the shaft-shaped member protruding from the lower surface of the upper housing when the securing screw is loosened.

10. A droplet discharge apparatus comprising:
the droplet discharge head according to claim 7.

11. A droplet discharge head comprising:
a lower housing including a flow channel;
an upper housing on the lower housing, the upper housing detachable from the lower housing;
a nozzle plate on a lower surface of the lower housing;
a shaft-shaped member including a means for opening and closing a nozzle orifice of the droplet discharge head at a tip end of the shaft-shaped member, the shaft-shaped member being reciprocatable in the upper housing; and a driver in the upper housing to reciprocate the shaft-shaped member in an axial direction of the shaft-shaped member, wherein:

the shaft-shaped member is movable in the axial direction of the shaft-shaped member such that a length of the tip end of the shaft-shaped member protruding from a lower surface of the upper housing is shortened, and the shaft-shaped member is movable in the axial direction of the shaft-shaped member when the driver is not driven.

12. The droplet discharge head according to claim 11, further comprising:

a biasing member to bias the shaft-shaped member toward the upper housing.

13. The droplet discharge head according to claim 12, wherein the driver includes a piezoelectric element and a holder to hold the piezoelectric element, and wherein the shaft-shaped member is positioned when a rear end of the holder is positioned relative to and secured to the upper housing.

14. The droplet discharge head according to claim 13, wherein the upper housing includes an elongated hole at the rear end of the upper housing, and wherein the holder is positioned relative to and secured to the upper housing when a securing screw inserted in the elongated hole is screwed into the rear end of the holder.

15. The droplet discharge head according to claim 14, wherein the biasing member biases the shaft-shaped member such that the shaft-shaped member moves toward the upper housing to shorten the length of the tip end of the shaft-shaped member protruding from the lower surface of the upper housing when the securing screw is loosened.

16. A droplet discharge apparatus comprising:

the droplet discharge head according to claim 11.

* * * * *